United States Patent [19]

Nix et al.

[11] Patent Number: 4,998,609
[45] Date of Patent: Mar. 12, 1991

[54] DAMPER FOR HYDRAULIC CLUTCH ACTUATOR

[75] Inventors: Richard A. Nix, Auburn Hills; Leslie P. Branum, Sterling Heights; Mark W. Rei, Sterling Heights; Michael L. Schwartz, Troy, all of Mich.

[73] Assignee: Automotive Products plc, Warwickshire, England

[21] Appl. No.: 466,051

[22] Filed: Jan. 16, 1990

[51] Int. Cl.$^5$ .................. F16D 25/12; F16D 25/08
[52] U.S. Cl. .................. 192/109 F; 192/30 V; 192/85 C
[58] Field of Search .............. 192/30 V, 85 C, 109 D, 192/109 F; 303/87; 60/533

[56] References Cited

U.S. PATENT DOCUMENTS 4,188,073 2/1980 Ishikawa et al. .................. 303/87

FOREIGN PATENT DOCUMENTS

| 54-3731 | 1/1979 | Japan | 192/30 V |
| 59-50232 | 3/1984 | Japan | 192/109 D |
| 59-89833 | 5/1984 | Japan | 192/109 F |
| 59-89834 | 5/1984 | Japan | 192/109 F |
| 2058272 | 4/1981 | United Kingdom | 192/30 V |

Primary Examiner—Richard Lorence
Attorney, Agent, or Firm—Krass & Young

[57] ABSTRACT

A damper for use in a hydraulic clutch actuator to attenuate vibrations transmitted from the crankshaft of the engine of the associated vehicle to the clutch pedal. The baffle includes an elongated cylindrical housing positioned in the conduit interconnecting the master and slave cylinders of the actuator coaxial with the axis of the conduit and including a spring biased piston mounted in the bore of the housing. The housing is open at its rear end and closed at its front end by an end wall defining an outlet port for the damper and the piston includes a central through passage defining the inlet port of the damper at the rear end of the through passage. A baffle is provided at the front end of the piston to provide a circuitous path between the central passage of the piston and the outlet port of the damper. In an alternate embodiment, the damper further includes the male half of a quick connect coupling so as to facilitate the use of the damper in a clutch actuator of the type including separate prefilled modules which are connected by the quick coupler following installation of the separate modules.

23 Claims, 2 Drawing Sheets

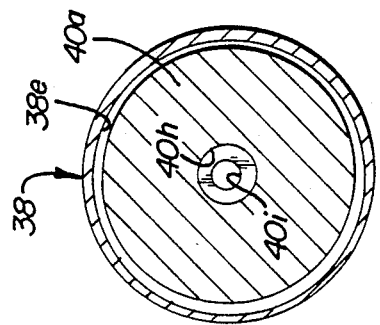
FIG-3
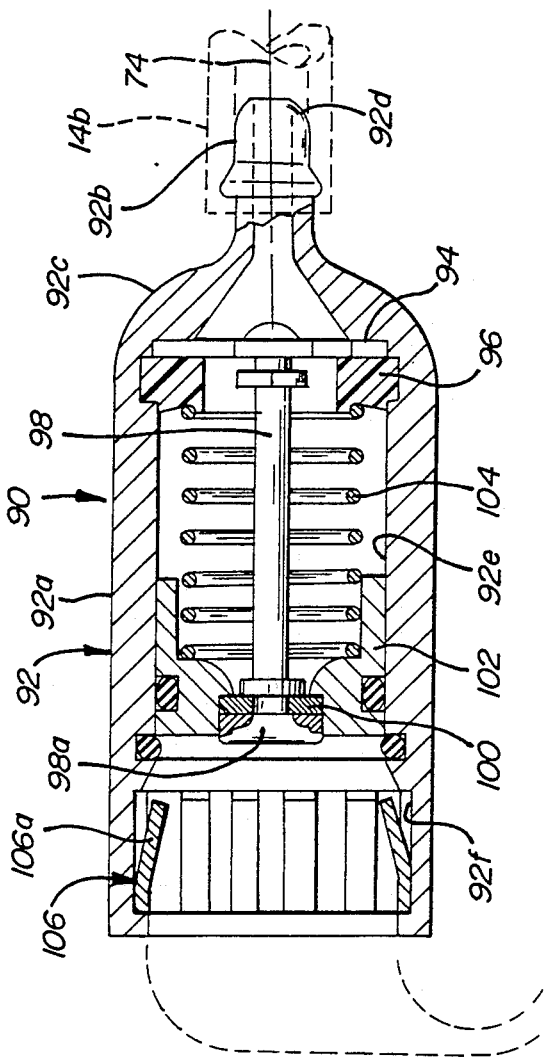
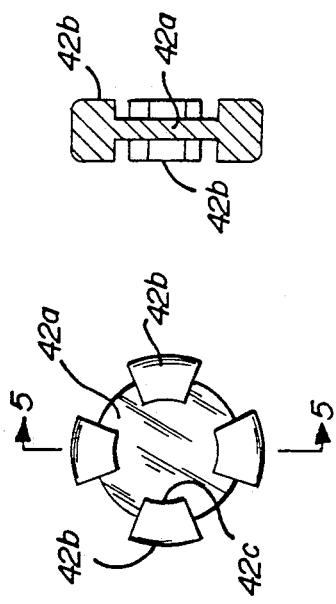
FIG-4
FIG-5
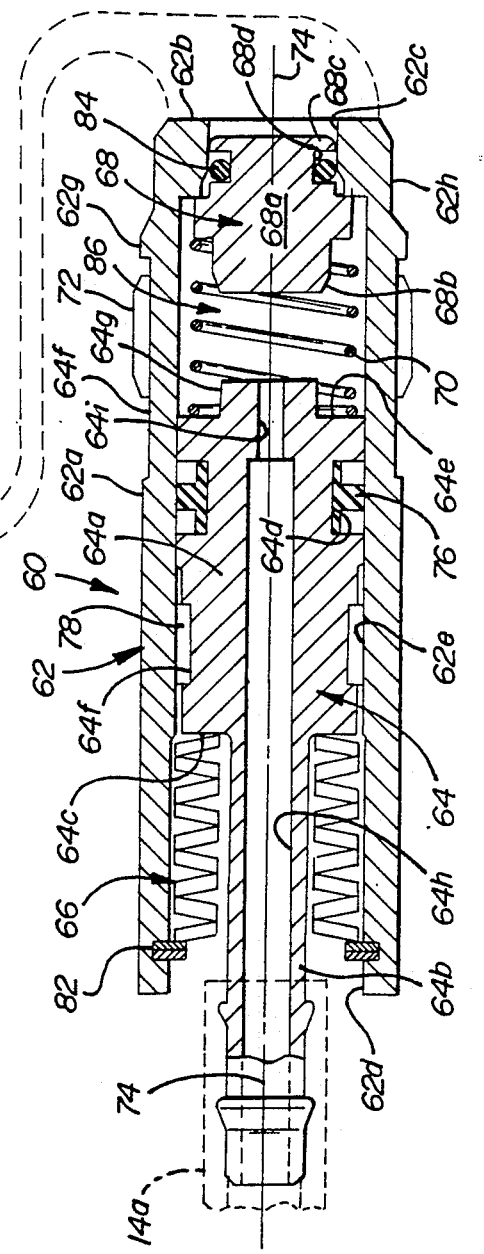
FIG-6

DAMPER FOR HYDRAULIC CLUTCH ACTUATOR

BACKGROUND OF THE INVENTION

This invention relates to hydraulic clutch actuators and more particularly to hydraulic clutch actuators employing a damper mechanism.

Hydraulic actuators are known for operating a mechanism at a remote location by way of a master cylinder connected to a slave cylinder installed at a remote location. A conduit interconnects the master cylinder to the slave cylinder and the hydraulic apparatus is filled with hydraulic fluid such that, when the piston of the master cylinder is actuated, the piston of the slave cylinder and consequently the piston rod or output member is simultaneously actuated by displacement of the hydraulic fluid from the master cylinder to the slave cylinder through the conduit.

More particularly, it is known to provide such a hydraulic actuator for operating the clutch of a motor vehicle so that when the clutch pedal of the vehicle is depressed by the driver, the slave cylinder is actuated to operate the clutch in known manner. Whereas hydraulic clutch actuators have enjoyed significant commercial success they have the ability to transmit vibrations backwardly through the system from the clutch to the clutch pedal with the result that the operator may experience unpleasant vibrations at the clutch pedal.

Specifically, imbalances in the crankshaft of the vehicle engine or engine firing impulses are transmitted to the flywheel which undergoes a swashing movement, the flywheel swashing movement in turn leads to vibrations of the spring fingers of the clutch release mechanism, the vibrations of the spring fingers are transferred to the release bearing of the clutch, and the vibrations propagate backwardly through the hydraulic fluid in the slave cylinder, through the hydraulic fluid in the conduit interconnecting the slave cylinder and the master cylinder, through the hydraulic fluid in the master cylinder, and thence through the master cylinder push rod to the clutch pedal where they are experienced by the operator as vibrations of the clutch pedal. The propagated vibrations also generate a pedal growl which is audible to the operator as well as a clutch roar which may also be audible to the operator.

Various devices have been proposed in an attempt to attenuate these vibrations. For example, tuned masses have been attached to various parts of the clutch system including the clutch release lever, the slave cylinder push rod, and the clutch pedal. Rubber dampers have also been employed in the master cylinder push rod, rubber hose sections have been employed in the conduit interconnecting the master cylinder and the slave cylinder, and various damper devices have been proposed for installation in the interconnecting conduit.

Whereas these prior art devices have been successful in varying degrees in attenuating the vibrations in the system, they have each suffered one or more shortcomings. Specifically, the prior art devices have been unduly expensive; or they have actually introduced vibrations into the system by virtue of a hysteresis effect; or they have required a package size that has complicated their installation and placement in the crowded under hood environment of a modern day motor vehicle; or they have been difficult to selectively adjust to accommodate varying vehicular applications.

SUMMARY OF THE INVENTION

The present invention is directed to the provision of an improved damper device for use in association with a hydraulic clutch actuator.

The invention damper is intended for use with a hydraulic clutch actuator of the type including a master cylinder having a discharge port, a slave cylinder having a inlet port, and a conduit extending between the master cylinder discharge port and the slave cylinder inlet port. According to the invention, the damper is placed in the conduit interconnecting the master cylinder and the slave cylinder and includes a housing defining a bore having a central longitudinal axis extending parallel to the central longitudinal axis of the conduit and a spring biased piston mounted for reciprocal movement in the bore. This arrangement provides effective damping action in a simple, inexpensive and compact package.

According to a further feature of the invention, the central longitudinal axis of the housing bore is coaxial with the central longitudinal axis of the conduit. This particular arrangement optimizes the compactness and effectiveness of the damper.

According to a further feature of the invention, the piston is annular and defines a central passage extending axially therethrough. This arrangement allows the piston to provide a conduit means for hydraulic fluid flowing through the damper and further optimizes the compactness of the damper package.

According to a further feature of the invention, the central passage in the piston is coaxially with the central longitudinal axes of the conduit and the housing bore; the housing includes a main body portion defining the housing bore and an end wall portion at one end of the housing; the piston coacts at one end thereof with the housing side wall and end wall to define a hydraulic pressure chamber proximate the one end of the housing; the damper includes an inlet port and an outlet port; the outlet port is defined in the housing end wall; and the inlet port is defined at the other end of the piston by the central passage in the piston. This specific arrangement further optimizes the in-line aspect of the invention damper and further contributes to the optimization of the compactness of the invention damper.

According to a further feature of the invention, the piston includes a main body portion slidably mounted in the bore and a reduced diameter fitting portion at the other end of the piston extending axially from the main body portion and terminating in a free end, and the central passage in the piston extends through the main body portion of the piston and through the fitting portion of the piston and opens at the free end of the fitting portion to define the inlet port for the damper. This specific arrangement allows the piston to define both the sprung mass for the damper as well as the inlet port for the damper.

According to a further feature of the invention, the piston is spring biased by spring means disposed in the bore of the housing in concentric surrounding relation to the reduced diameter fitting portion of the piston. In the disclosed embodiment of the invention, the spring means comprise a plurality of Belleville washers serially arranged. This particular spring arrangement provides a compact and efficient means of spring biasing the piston and allows ready tailoring of the damper to match varying vehicular applications.

According to a further feature of the invention, the housing further includes a fitting portion extending axially from the housing end wall coaxial with the central passage in the piston and defining the inlet port of the damper. This specific arrangement further contributes to the in-line, compact packaging of the damper.

According to a further feature of the invention, the damper further includes means defining a baffle between the inlet port of the damper and the central passage in the piston. In the disclosed embodiment, the baffle means includes a baffle member secured to the one end of the piston and including a solid central portion blocking direct axial communication between the outlet port of the damper and the central passage in the piston and means defining a circuitous passage extending around the central portion of the damper and providing communication between the outlet port and the central passage in the piston. The baffle acts in cooperation with the spring biased piston to attenuate the vibrations in the conduit.

In an alternate embodiment of the invention, the damper is combined with one-half of a quick connect coupling so that the damper may be incorporated in the quick connect coupling in those applications where the master cylinder and slave cylinder are provided as separate prefilled modules and subsequently connected, utilizing the quick connector, following the separate installation of the modules in the motor vehicle.

BRIEF DESCRIPTION OF THE DRAWINGS

FIG. 3 is a transverse cross-sectional view of the invention damper taken on line 3—3 of FIG. 2;

FIGS. 4 and 5 are detail views of a baffle member employed in the invention damper; and FIG. 6 is a view of a modified form of the invention damper.

DETAILED DESCRIPTION OF THE PREFERRED EMBODIMENT

Figure 1:
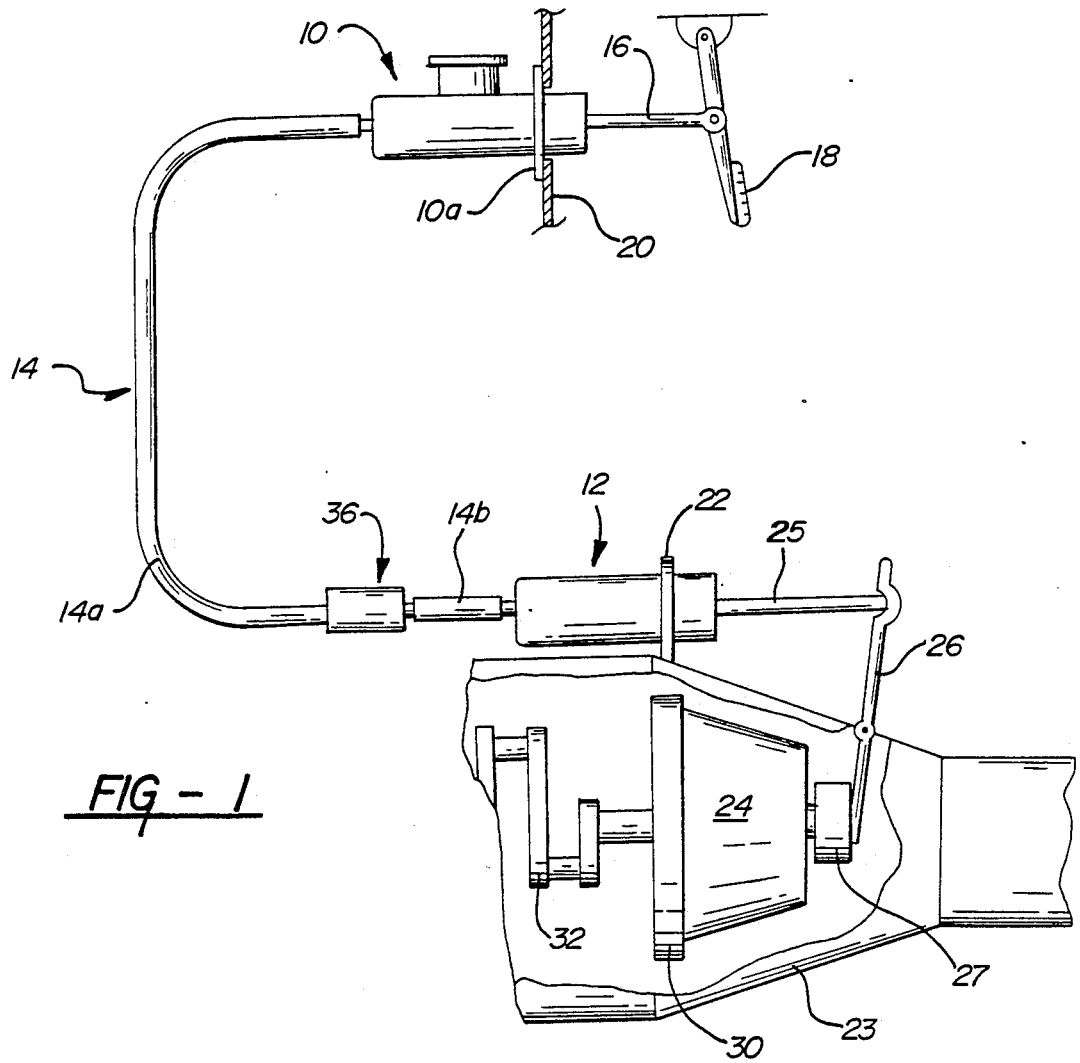
FIG. 1 is a somewhat schematic view of a hydraulic clutch actuator employing the invention damper.
Figure 2:
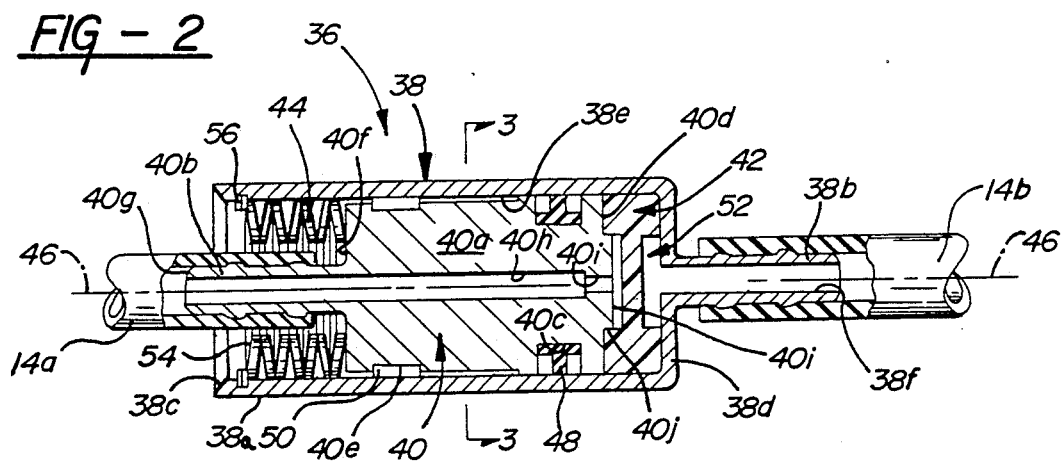
FIG. 2 is a longitudinal cross-sectional view of the invention damper.

The hydraulic clutch actuator shown schematically in FIG. 1 includes a master cylinder 10, a slave cylinder 12, and a conduit 14 extending between the outlet or discharge of the master cylinder and the inlet of the slave cylinder.

Master cylinder 10 includes an input rod 16 connected in known manner to the clutch pedal 18 of an associated motor vehicle so that pivotal movement of the clutch pedal by the vehicle operator moves a piston of the master cylinder in known manner to discharge pressure fluid from the cylinder. Cylinder 10 further includes a flange 10a to facilitate attachment of the master cylinder to the firewall 20 of the vehicle.

Slave cylinder 12 is secured as by a bracket 22 to the bell housing 23 enclosing the clutch 24 of the vehicle and includes an output rod 25 coacting in known manner with a clutch release lever 26 so that pivotal movement of clutch pedal 18 by the operator results in discharge of pressure fluid from master cylinder 10 for conveyance through conduit 14 to slave cylinder 12 to provide extension of output rod 25 and pivotal movement of release lever 26 to move the clutch release bearing 27 in a direction to disengage the clutch 24. Clutch 24 is driven in known manner by a flywheel 30 which in turn is driven by an engine crankshaft 32.

The invention damper 36 is interposed in conduit 14 preferably at a location closer to the inlet of slave cylinder 12 than to the outlet of master cylinder 10.

Damper 36 includes a housing 38, a piston 40, a baffle 42, and spring means 44.

Housing 38 may be formed of a suitable metallic material such as aluminum or steel and includes a main body tubular cylindrical portion 38a and a fitting portion 38b.

Main body portion 38a is open at the rear end 38c of the housing and is closed at the front end of the housing by a front end wall 38d. Housing main body portion 38a defines an axial bore 38e having a central longitudinal axis 46. Fitting 38b extends axially forwardly from housing front end wall 38d and defines a central outlet passage or port 38f coaxial with central axis 46 and opening in end wall 38d.

Piston 40 may be formed of a suitable metallic material such as aluminum or steel and includes a main body portion 40a and a fitting portion 40b. Main body portion 40a is cylindrical and is generally sized for sliding reciprocal movement in bore 38e. Main body portion 40a defines an annular groove 40c proximate the front end 40d of the main body portion for receipt of an annular seal 48 and a further annular groove 40e proximate the rear end 40f of the main body portion for receipt of an annular glide ring 50. Fitting portion 40b extends axially rearwardly from the rear end 40f of piston main body portion 40a and terminates in a free rear end 40g positioned proximate the open rear end 38c of housing main body portion 38a. A central axial passage 40h extends through piston fitting portion 40b and through piston main body portion 40a and terminates in a reduced diameter passage portion 40i opening in the forward end 40d of the piston main body portion. Passages 40h and 40i are coaxial with axis 46 and are therefore coaxial with bore 38e and with passage 38f.

Baffle 42 may be formed of a suitable plastic material such as nylon and includes a central, solid, generally disk shaped portion 42a and a plurality of circumferentially spaced segment portions 42b extending axially from either side of central portion 42a. Baffle 42 is press fit on the forward end of piston main body portion 40a with the inner arcuate peripheries 42c of segment portions 42b press fit over a hub portion 40j defined on the front end 40d of the piston main body portion. Baffle 42 has an overall cylindrical configuration with an overall diameter generally matching the diameter of piston main body portion 40a so that the baffle 42 may slidably reciprocate with piston 40 in bore 38e.

It will be seen that the forward end 40d of the piston coacts with the side wall and front end wall of housing 38 to define a pressure chamber 52 and that the baffle 42 is positioned in chamber 52 and precludes direct axial communication between passage 38f and piston passage 40i but defines a circuitous fluid passage between passages 38f and 40i extending radially outwardly along the front face of baffle main body portion 42a, axially between spaced segment portions 42b, and then radially inwardly along the rear face of damper main body portion 42a for communication with passage portion 40i and thereby with piston central passage 40h.

Spring means 44 comprise a plurality of serially arranged Belleville washers 54 positioned in concentric surrounding relation to piston fitting portion 40b and extending between a snap ring 56, seated in a groove in housing main body portion 38a proximate open end 38c, and the rear annular end 40f of piston main body portion 40a. A spacer or spacers may also be provided in the axial space between snap ring 56 and rear annular end 40f, in conjunction with the Belleville washers, to selectively vary the spring force exerted by the spring means.

In use, damper 36 is interposed in conduit 14 with one segment 14a of the conduit fitted over barbs defined on piston fitting portion 40b and the other segment 14b of the conduit fitted over barbs defined on housing fitting portion 38b so that, thus installed in conduit 14, the central axis of housing 38, the axes of piston central passages 40h and 40i, and the axis of passage 38f all lie on axis 46 which is also the central longitudinal axis of the conduit so that the damper 36 is totally in line with respect to the conduit and presents a compact low profile package relative to the conduit. For example, conduit sections 14a and 14b may be formed of a nylon 12 material and may have an outside diameter of 5/16 of an inch and housing 38 may have an outside diameter of ⅜ of an inch.

The invention damper has been found to significantly attenuate the vibrations that are transmitted from the crankshaft through the clutch and through the clutch actuator to the clutch pedal and, specifically, has been found to significantly reduce the clutch pedal growl and clutch roar that sometimes accompany hydraulic clutch actuators. Quantitatively, based on power density measurements made at the clutch pedal utilizing an accelerometer mounted proximate the clutch pedal, the reduction in vibration intensity experienced at the clutch pedal, as compared to an undamped hydraulic clutch actuator system and as measured in various differing vehicular applications, ranged from a reduction of 25% at 5,500 engine rpms to a reduction of 59% at 3,000 engine rpms. During the damping operation, the piston and baffle member move reciprocally together in bore 38e and act as a sprung mass added to the hydraulic clutch actuator system, with the effect of attenuating the vibrations being transmitted through the clutch actuator back to the clutch pedal. Whereas the invention damper without the baffle member 42 has been found to effect significant reductions in the power density measured at the clutch pedal, more significant reductions in power density are achieved by the invention damper utilizing the baffle member 42.

The magnitude of the sprung mass added to the system may of course be readily varied by varying the number of Belleville washers employed in the system so as to allow the invention damper to be readily customized for various and varying vehicular applications. Further, the extremely low profile presented by the invention damper by virtue of its in-line disposition relative to the conduit 14 allows the clutch actuator including the invention damper to be readily routed in the crowded under hood space of a modern day motor vehicle and specifically allows the damper to pass through restricted spaces in the vehicle environment including restricted apertures in vehicular bulkheads. The invention damper is also, by virtue of its extreme simplicity, relatively inexpensive to produce and install as compared to prior art damping devices and has a low weight as compared to prior art damper devices. Further, the hysteresis introduced into the overall system by the damper is extremely small as compared to certain prior art damping devices so as to avoid the introduction of further vibrations into the system because of hysteresis created by the damping device itself.

A modified form of the invention damper is seen in FIG. 6 wherein the damper is incorporated into a quick connect coupler and, specifically, into a male quick connect coupler for cooperation in known manner with a female quick connect coupler so as to allow the clutch actuator to be provided to the vehicle manufacturer in modular prefilled form for subsequent connection of the quick connect couplers following installation of the modules during the vehicle assembly process.

The invention damper 60 as seen in FIG. 6 includes a housing 62, a piston 64, a spring means 66, a valving member 68, a spring 70, and a disconnect collar or ring 72.

Housing 62 may be formed of a suitable metal such as aluminum or steel and includes a main body cylindrical portion 62a and a front end wall portion 62b defining a valving opening 62c. Housing main body portion 62a is open at its rear end 62d and defines a bore 62e centered on a central longitudinal axis 74. Valving opening 62c is also centered on axis 74.

Housing main body portion 62a further defines an external cylindrical guide surface 62f proximate the forward end of the housing and an annular ridge or bead 62g at the forward end of guide surface 62f.

Piston 64 may be formed of a suitable metal such as aluminum or steel and is generally similar to the piston 40 of the FIGS. 1-5 embodiment. Specifically, piston 64 includes a main body portion 64a, a fitting portion 64b extending rearwardly from the annular rear end 64c of main body portion 64a; an annular groove 64d proximate the forward end 64e of the main body portion receiving an annular seal 76; a further annular groove 64f proximate the rear end of the main body portion receiving a glide ring 78; a pilot or nose portion 64g at the forward end of the main body portion; and a central passage 64h extending through fitting portion 64b and through main body portion 64a and terminating proximate the forward end of the main body portion in a reduced diameter passage portion 64i. Passages 64h and 64i are centered on axis 74.

Spring means 66 comprise a plurality of Belleville washers 80 arranged between the rear annular face 64c of piston main body portion 64a and a snap ring 82 seated in an annular groove in housing main body portion 62a proximate the open rear end 62d of the housing main body portion.

Valving member 68 is sized to fit within bore 62e and sealingly coacts with valving aperture 62c. Valving member 68 includes a main body portion 68a, a rear nose portion 68b, a forward portion 68c, and an annular groove 68d receiving an O-ring 84 for sealing coaction with valving aperture 62c.

Spring 70 comprises a coil spring which is fitted at its rear end over piston nose portion 64g and at its front end over valving member nose portion 68b and is normally operative to bias valving member 68 into a position in sealing coaction with valving aperture 62c to preclude the escape of hydraulic fluid from the pressure chamber 86 defined between the forward end of the piston and housing front end wall portion 62b.

Damper 60 is designed for coupling coaction with a female coupler 90 which may be of the type, for example, shown in applicant's co-pending U.S. patent application Ser. No. 310,839.

Female coupler 90 includes a tubular housing 92 including a tubular main body portion 92a and a reduced diameter fitting portion 92b extending axially forwardly from the closed front end 92c of the housing and defining a discharge port 92d; an apertured disk 94 positioned in the forward end of the housing by a retainer ring 96; a stem or rod 98 extending axially rearwardly from disk 94 and including an enlarged head portion 98a at its rear free end defining an annular groove carrying an annular seal 100; a valving member 102 slidably mounted in the bore 92e of housing main body portion 92a; a coil spring 104 positioned around stem 98 and extending between retainer ring 96 and an interior annular shoulder 102a defined by valving member 102 and operative to bias valving member 102 into sealing coaction with annular seal 100; and a split retainer clip 106, formed of a spring steel and including a plurality of resilient finger portions 106a, fitted in an annular interior seat 92f defined proximate the rear end of housing main body portion 92a.

It will be understood that female coupler 90 coacts in known manner with the male coupler portion of damper 60 in response to insertion of the front end 62h of housing 62 into bore 92e of the housing of the female coupler to move valving member 68 away from aperture 62c and move valving member 102 away from seal 100 so as to provide fluid communication through the coupled couplers with the male member being held securely within the female member by snapping engagement of the free ends of spring finger portions 106a behind ridge 62g and with ring 72 accessible by an operator to release the spring finger portion 106a from engagement with ridge 62g in response to forward reciprocal movement of ring 72 on guide surface 62f so as to allow uncoupling of the couplers. Further details of coupler 90 are disclosed in copending U.S. application Ser. No. 310839.

Female coupler 90 is fitted to conduit section 14b and damper 60 is fitted to conduit section 14a so that when the damper 60 is fitted into the female coupler 90 a continuous fluid path is established between the master cylinder and the slave cylinder so as to enable engagement and disengagement of the clutch in response to pivotal movement of the associated clutch pedal of the vehicle. As with the FIGS. 1-5 embodiment, the piston 64 of the damper 62 serves as a sprung mass added into the system and serves to significantly attenuate the vibrations being transmitted from the engine crankshaft through the clutch actuator to the clutch pedal so that the power density of the vibrations, as sensed by an accelerometer mounted proximate the clutch pedal, is significantly reduced as compared to an undamped system.

In both the FIGS. 1-5 embodiment and the FIG. 6 embodiment the clutch actuator is preferably provided to the motor vehicle manufacturer in a prefilled form constituting, in the case of the FIGS. 1-5 embodiment, a single prefilled assembly including the master cylinder, conduit and slave cylinder and constituting, in the case of the FIG. 7 embodiment, a first prefilled module including the master cylinder, the conduit section 14a, and the damper 62, and a second prefilled module including female coupler 90, conduit section 14b, and the slave cylinder. In both embodiments of the invention, the invention damper significantly attenuates the vibrations transmitted from the crankshaft to the clutch pedal; allows ready tailoring of the damper to suit a wide variety of vehicular applications; provides a simple and inexpensive package; and provides a compact and readily routable package by virtue of the in line disposition of the damper.

Whereas preferred embodiments of the invention have been illustrated and described in detail, it will be apparent that various changes may be made in the disclosed embodiments without departing from the scope or spirit of the invention.

We claim:

1. A damper for use with a hydraulic clutch actuator of the type including a master cylinder, a slave cylinder, and conduit means interconnecting the master and slave cylinders, said damper being provided in said conduit means and including:
   (A) an axially extending housing having a front end and a rear end and defining an axial bore having a central axis and bounded at the front end thereof by a front end wall of said housing;
   (B) means defining a first port in said front end wall for connection in said conduit means;
   (C) a piston having a front end and a rear end and mounted for reciprocal axial movement in said bore in continuous sealing engagement with said bore and coacting at the front end thereof with said front end wall to define a hydraulic pressure chamber communicating with said first port;
   (D) means defining a second port proximate the rear end of said housing for connection in said conduit means;
   (E) passage means extending axially through said piston in coaxial relation to said first and second ports and providing hydraulic fluid communication between said pressure chamber and said second port; and
   (F) spring means biasing said piston forwardly toward said front wall end of said housing.

2. A damper according to claim 1 wherein:
   (G) said passage means comprises a central axial passage extending through said piston coaxial with said central axis.

3. A damper according to claim 1 wherein:
   (G) said damper includes a quick connect coupler proximate the front end of said housing.

4. A damper according to claim 3 wherein:
   (H) said quick connect coupler comprises a male quick connect coupler including a valving member positioned in said pressure chamber and sealingly coacting with said first port and spring means biasing said valving member forwardly into sealing coaction with said first port.

5. A coupler according to claim 4 wherein:
   (I) said spring means comprises a spring positioned in said pressure chamber between said front end of said piston and said valving member.

6. A damper for use with a hydraulic clutch actuator of the type including a master cylinder, a slave cylinder, and conduit means interconnecting the master and slave cylinders, said damper being provided in said conduit means and including:
   (A) an axially extending housing having a front end and a rear end and defining an axial bore having a central axis and bounded at the front end thereof by a front end wall of said housing;
   (B) means defining a first port in said front end wall for connection in said conduit means;
   (C) a piston having a front end and a rear end and mounted for reciprocal axial movement in said bore and coacting at the front end thereof with said front end wall to define a hydraulic pressure chamber communicating with said first port;

(D) means defining a second port on said piston proximate the rear end of said piston for connection in said conduit means;

(E) passage means extending axially through said piston in coaxial relation to said central axis and providing hydraulic fluid communication between said pressure chamber and said second port; and (F) spring means biasing said piston forwardly toward said front wall end of said housing.

7. A damper for use with a hydraulic clutch actuator of the type including a master cylinder, a slave cylinder, and conduit means interconnecting the master and slave cylinders, said damper being provided in said conduit means and including:

(A) an axially extending housing having a front end and a rear end and defining an axial bore having a central axis and bounded at the front end thereof by a front end wall of said housing;

(B) means defining a first port in said front end wall for connection in said conduit means;

(C) a piston having a front end and rear end and mounted for reciprocal axial movement in said bore and coacting at the front end thereof with said front end wall to define a hydraulic pressure chamber communicating with said first port;

(D) means defining a second port on said piston proximate the rear end of said piston for connection in said conduit means; and (E) passage means extending axially through said piston and providing hydraulic fluid communication between said pressure chamber and said second port.

8. A damper according to claim 7 wherein:

(I) said piston includes a main body portion slidably mounted in said bore and a reduced diameter fitting portion extending axially rearwardly from the rear end of said main body portion and terminating in a free rear end; and (J) said central axial passage extends through said main body portion and through said fitting portion and opens at said free rear end of said fitting portion to define said second port.

9. A damper according to claim 8 wherein:

(K) said spring means are disposed in said bore in concentric surrounding relation to said reduced diameter fitting portion.

10. A damper according to claim 9 wherein:

(L) said spring means comprise a plurality of Belleville washers serially arranged.

11. A damper according to claim 7 wherein:

(I) said first port is defined on said central axis; and (J) said damper further includes means defining a baffle between said first port and said central axial passage.

12. A damper according to claim 11 wherein:

(K) said baffle defining means comprises a baffle member secured to the front end of said piston and including a solid central portion and means defining axial passages proximate the periphery thereof.

13. A hydraulic clutch actuator comprising:

(A) a master cylinder having a discharge port;

(B) a slave cylinder having an inlet port; and (C) a conduit extending between said master cylinder discharge port and said slave cylinder inlet port and defining a central longitudinal conduit axis;

(D) a damper in said conduit and including a housing defining a bore having a central longitudinal axis extending parallel to the central longitudinal axis of said conduit and a spring biased piston mounted for reciprocal movement in said bore in continuous sealing engagement with said bore;

(E) said piston being annular and defining a central passage extending axially therethrough coaxial with the central longitudinal axis of said conduit.

14. A clutch actuator according to claim 13 wherein:

(F) said central longitudinal axis of said bore is coaxial with said central longitudinal axis of said conduit.

15. A hydraulic clutch actuator comprising:

(A) a master cylinder having a discharge port;

(B) a slave cylinder having an inlet port;

(C) a conduit extending between said master cylinder discharge port and said slave cylinder inlet port and defining a central longitudinal conduit axis; and (D) a damper in said conduit and including a housing defining a bore having a central longitudinal axis extending parallel to the central longitudinal axis of said conduit and a spring biased piston mounted for reciprocal movement in said bore in sealing engagement with said bore;

(E) said piston being annular and defining a central passage extending axially therethrough;

(F) said central passage being coaxial with said central longitudinal axis of said conduit and said bore;

(G) said housing including a main body portion defining said bore and a front end wall portion at the front end of said housing;

(H) said piston coacting at the front end thereof with said housing front end wall to define a hydraulic pressure chamber proximate said front end of said housing;

(I) said damper including an inlet port and an outlet port;

(J) said outlet port being defined in said front end wall;

(K) said inlet port being defined at the rear end of said piston by said central passage.

16. An actuator according to claim 15 wherein:

(L) said piston includes a main body portion slidably mounted in said bore and a reduced diameter fitting portion at said rear end of said piston extending axially rearwardly from said main body portion and terminating in a free rear end and said central passage extends through said main body portion and through said fitting portion and opens at said free rear end of said fitting portion to define said inlet port.

17. An actuator according to claim 16 wherein:

(M) said piston is spring biased by spring means disposed in said bore in concentric surrounding relation to said reduced diameter fitting portion.

18. A damper according to claim 17 wherein:

(N) said spring means comprises a plurality of Belleville washers serially arranged.

19. An actuator according to claim 17 wherein:

(N) said housing includes a fitting portion extending axially forwardly from said front end wall coaxial with said central passage and defining said outlet port.

20. An actuator according to claim 19 wherein:

(O) said damper further includes means defining a baffle between said inlet port and said central passage.

21. An actuator according to claim 20 wherein:

(P) said baffle defining means comprises a baffle member secured to said front end of said piston and including a solid central portion blocking direct axial communication between said outlet port and said central passage and means defining a circuitous passage extending around said central portion and providing communication between said outlet port and said central passage.

22. A vehicular hydraulic clutch actuator including a master cylinder adapted for connection to a vehicle clutch pedal, a slave cylinder adapted for connection to a vehicle clutch, a conduit extending between the outlet of the master cylinder and the inlet of the slave cylinder, and a damper in the conduit to attenuate vibrations transmitted from the vehicle clutch to the vehicle clutch pedal through the hydraulic clutch actuator, characterized in that said damper includes a housing defining a bore having a central longitudinal axis extending parallel to the central longitudinal axis of said conduit and a spring biased annular piston mounted for reciprocal movement in said bore in continuous sealing engagement with said bore and defining a central axial passage coaxial with said central longitudinal axis of said conduit.

23. A damper for use with a hydraulic clutch actuator of the type including a master cylinder, a slave cylinder, and conduit means interconnecting the master and slave cylinders, said damper being provided in said conduit means and including:
  (A) an axially extending housing having a front end and a rear end and defining an axial bore having a central axis and bounded at the front end thereof by a wall of said housing;
  (B) means defining a first port at said front end of said housing for connection in said conduit means;
  (C) a piston having a front end and a rear end and mounted for reciprocal axial movement in said bore in continuous sealing engagement with said bore and coacting at the front end thereof with said wall to define a hydraulic pressure chamber communicating with said first port;
  (D) means defining a second port proximate the rear end of said housing for connection in said conduit means;
  (E) passage means extending axially within said damper in coaxial relation to said first and second ports and providing hydraulic fluid communication between said pressure chamber and said second port; and
  (F) spring means biasing said piston forwardly toward said front end of said housing.

* * * * *